A. H. MOSES, Jr.
FILM CAMERA.
APPLICATION FILED JUNE 10, 1914.

1,174,266.

Patented Mar. 7, 1916.
2 SHEETS—SHEET 1.

Witnesses:

Inventor
Alfred H. Moses Jr.
By his Attorney
Ross Millward

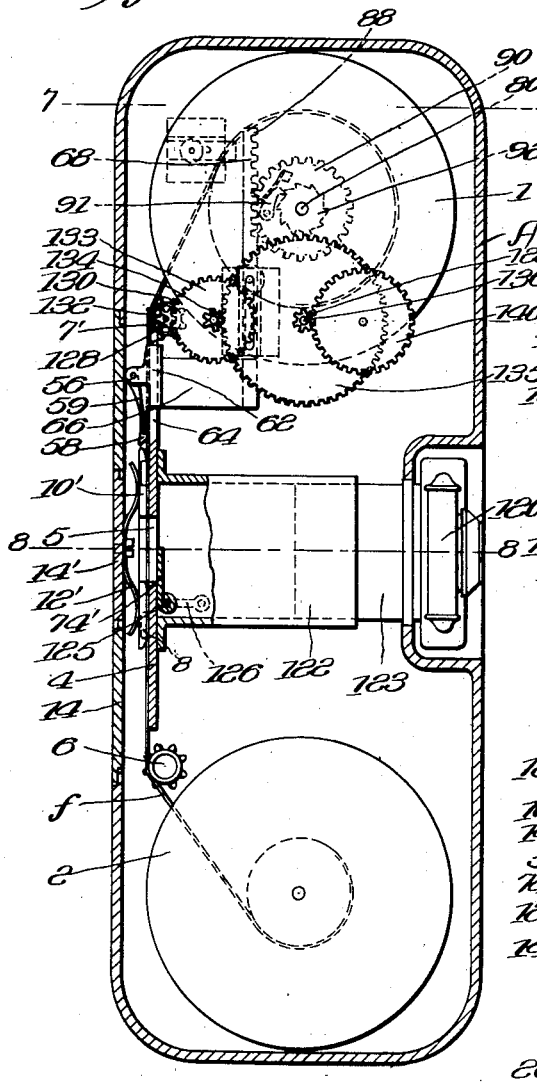

UNITED STATES PATENT OFFICE.

ALFRED H. MOSES, JR., OF NEW ROCHELLE, NEW YORK, ASSIGNOR TO ARTHUR H. HOTTE, OF MORRIS PARK, NEW YORK.

FILM-CAMERA.

1,174,266.  Specification of Letters Patent.  Patented Mar. 7, 1916.

Application filed June 10, 1914. Serial No. 844,305.

*To all whom it may concern:*

Be it known that I, ALFRED H. MOSES, Jr., a citizen of the United States, residing at New Rochelle, in the county of Westchester and State of New York, have invented new and useful Improvements in Film-Cameras, of which the following is a specification.

This invention relates to cameras and has as an object to provide a particularly compact camera arrangement for the traveler who wishes to take a great number of pictures. As a convenient device for accomplishing this purpose I have devised a camera suited for employing the standard perforated motion picture film thus providing a camera having a large capacity for pictures and employing a film which is especially suited for the purpose and is commercially available.

To that end I have designed a camera for taking single exposures as desired and adapted for properly feeding a film of considerable length and of the character described whereby the film may be fed with measured feed movements so as properly to space the pictures thereon.

Additional features of my invention comprise means for further increasing the capacity of the camera in the number of pictures which may be taken together with improved features of arrangement and construction which hereinafter more fully appear.

The described and other features and advantages of my invention will be understood by reference to the accompanying drawings wherein I have shown two of the possible embodiments of my invention.

Figure 1:
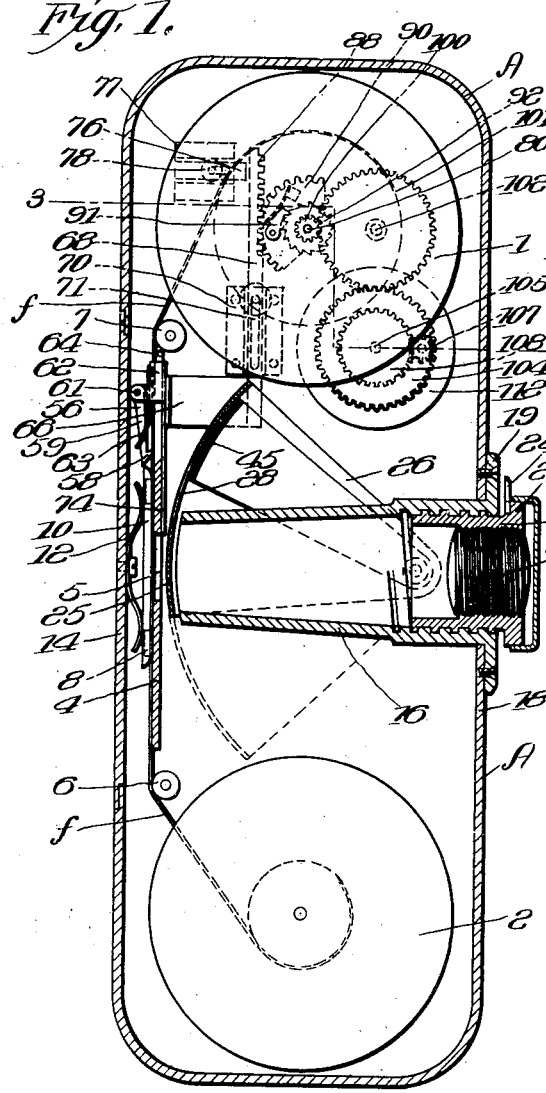
Figure 2:
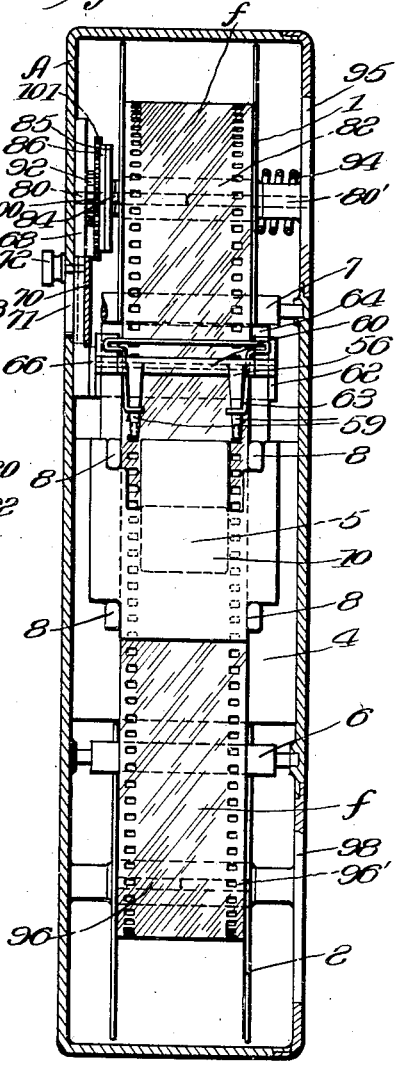
Figure 3:
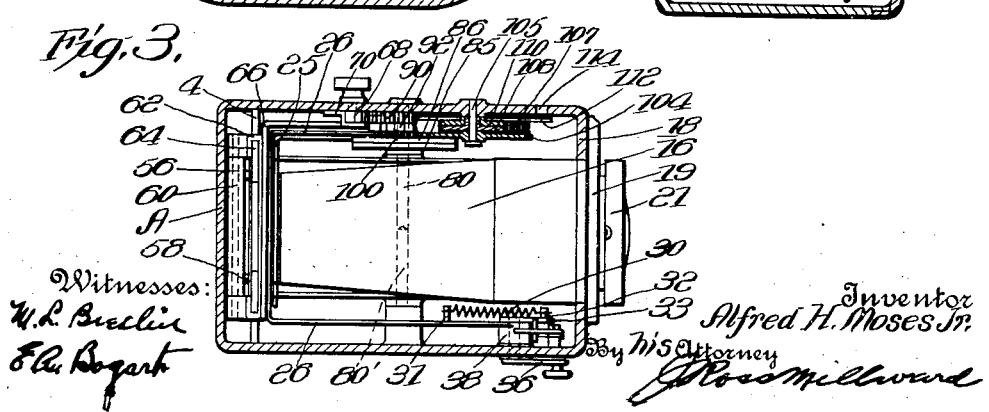

In the drawings, like reference characters are applied to the corresponding parts in the several views. Therein, Figure 1 is a vertical sectional view of a camera embodying the features of my invention. Fig. 2 is a rear view with the casing back removed and with portions shown in section; Fig. 3 is a horizontal sectional plan view on line 3—3 of Fig. 1. Figs. 4 and 5 are detail views of the shutter operating device shown in the camera of the preceding views being respectively side elevational and horizontal cross sectional views thereof. The remaining figures illustrate a modified form of my invention of which Fig. 6 is a vertical sectional view; Fig. 7 a horizontal cross sectional view on line 7—7 of Fig. 6 and Fig. 8 a similar view on line 8—8 of Fig. 6.

In the embodiment of my invention illustrated, the film carrying parts are arranged within a suitable supporting and inclosing casing A. They comprise the usual take-up and supply reels or spools 1 and 2 suitably journaled in the upper and lower portions of the casing respectively. Between the reels, the film is arranged to pass through an aperture frame where the exposures thereon are taken by means of a suitable arrangement of lens and shutter. The aperture frame is shown in the form of an apertured plate 4 vertically supported by the casing and provided with the usual aperture 5 through which the exposures are made. The film f is passed from the supply reel over a suitably journaled idler 6, thence over the rear surface of the aperture plate and over an upper similar idler 7 to the take-up reel. The film is guided by edge guides 8—8 which are lugs on the aperture plate and it is held flat against the surface of the plate by a rear pad element 10 supported in position by the lugs 8—8 and pressed against the film by a flat spring 12 secured to the back plate 14 of the casing. A suitable camera frame 16 is supported by the front plate 18 of the casing by having a vertical flange 19 thereof screwed to the front plate of the casing in the manner shown. The cylindrical front portion of the camera frame 16 is internally threaded as shown and fitted to the thread thereof is an externally threaded lens adjusting sleeve 20 having a thumb flange 21 on its front edge. A lens barrel 22 is carried by the sleeve 20 by being threaded thereto so that upon adjustment of the sleeve the lens are moved toward or from the film for the purpose of adjusting the focus. A finger or pointer 24 may desirably be arranged on the thumb flange 21 to indicate the focal length by its relation to suitable marking on the flange 19 of the frame.

Any suitable form of shutter may be provided and I have shown in the device of Fig. 1 a focal plane type of shutter. The shutter is formed of a curved blade 25 supported by integral side arms 26—26 and it is provided with the exposure aperture 28. The shutter is arranged to shut off the light from the film in its extreme upper and lower positions and is operative to make exposure during its passage from one position to the other. For that purpose it is fulcrumed by its arms 26—26 on the sides of the casing and is under the control of an actuating spring 30 attached to the shutter by a pin 31 and at its other end to a pin 32 of an operating lever 33. As best shown in Figs. 4 and 5 the operating lever 33 is fixed on a spindle 34 journaled in the side of the casing and having on its outer end, exterior of the casing, an operating handle 36. By means of the handle 36 the operating lever is swung so that the axis of the spring 30 is carried to one side or the other of the spindle which is the fulcrum for the shutter, for the shutter is journaled directly thereon by means of a collar 38. As a result, the spring 30 will exert a force on the shutter to move it upwardly when the lever is in the upper position, shown in full lines Fig. 4, and to move it to a lower position (dotted Fig. 1) when the lever is shifted by handle 36 to a lower position shown dotted in Fig. 4. During the movement of the shutter from the one position to the other the exposure is made by moving the aperture across the focal plane of the lens. As best understood by reference to Fig. 1, in either extreme position of the shutter a solid portion thereof is in position to intercept any rays of light so that the film is not then exposed.

To retard the action of the shutter until the operating lever has been shifted so as fully to energize the springs, I have arranged detent arms 40—40 pivotally supported on a pin 41 and caused to engage the collar 38 of the shutter by the tension of a retractile spring 42 attached to pins 43—43 on the detent arms. The collar 40 is provided with notches and shoulders positioned to be engaged by the detents to prevent movement of the shutter until the detents have been disengaged. This latter result is effected by the engagement of the operating arm with the detent arms at the very end of its shifting movement. As shown, the pins 43—43 are extended through the detent arms into the path of movement of the actuating arm 33 so that they are engaged thereby to release the shutter when the operating arm has been fully shifted. Thus the shutter will be operated to expose the film upon the movement of the handle from one position to the other, either up or down.

To adjust the time of the exposures so made a supplemental shutter 45 is movably carried by the main shutter 25 and adjustable with relation thereto to vary the size of the shutter opening 28. This supplemental shutter is supported at the opposite side of the casing from the operating handle 30 and is there fulcrumed with the shutter 25 concentric with the spindle 34. As shown, the main shutter has a sleeve bearing 47 journaled in the casing and within the sleeve is fitted the supporting spindle 48 of the supplemental shutter. On the outer end of the sleeve 47 there is secured an indicator segment 50 suitably graduated and affixed on the spindle to coact with the graduation marks of the segment is a pointer 51 to indicate the position of the supplemental shutter relative to the main shutter and the resulting size of the aperture 28. A clamping nut 52 is threaded on the spindle to secure the shutter members together when adjusted and on the end of the pointer a thumb piece 54 is provided for convenience in adjusting the supplemental shutter member.

A particular feature of my invention resides in the provision of means for feeding the film with measured feed movements so as to insure of moving the film the required distance for properly spacing the pictures one from the other. This I have shown accomplished by the employment of a suitable slip claw 56 arranged to be reciprocated so as to engage the perforations in the film, which as stated is the standard perforated motion picture film upon which the pictures are usually taken of a size and arrangement of one to every four longitudinally arranged perforations. I have here provided for taking pictures of a size substantially corresponding to those mentioned and therefore I have mounted the claw 56 to have a movement substantially the distance of four film perforations. The claw as best shown in Fig. 2 may be a double claw having inclined engaging teeth 58 resiliently supported on arms 59—59 and suitably formed so that they will ride over the film and perforations in one direction and will engage the film edge of a perforation when moved in the opposite direction to impart a similar movement to the film. The arms 59—59 are shown formed integral with a connecting sleeve 60 journaled on a pin 61 carried by ears of a slide member 62. A flat spring 63 is arranged as shown to produce a slight pressure on the claw-arms so that the teeth are pressed constantly into engagement with the perforations but will yield to permit the return movement of the claw. The slide 62 is formed to slide upon a vertical slide-way extension 64 of the aperture plate 4 to that end having its sides turned over to form a guiding groove fitted to the guide extension 64 as best shown in Fig. 3.

By means of angle arm 66 the slide 64 is connected to a slide bar 68 fitted to a vertical slideway formed by a slide-way plate 70 attached to the side of the casing. As shown the casing is provided with an elongated slot 71 through which is extended the shank of a finger button 72 carried by the slide bar and by which it is reciprocated from the exterior. The length of the slot 71 determines the distance of movement to be imparted to the film for properly spacing the pictures, as here shown, being arranged to effect the engagement of the claw with every fourth aperture of the film.

Associated with the described manner of spacing the pictures uniformly of a size corresponding to four film apertures, I have further provided for taking of pictures of half that size when desired so that the capacity of the camera in the number of pictures which may be taken is proportionately increased twofold. Carried by the slide 62 to be reciprocated therewith, is a shut off plate or door 74 of a width to cover the aperture 5 and arranged to cover the previously exposed film upon the slide being depressed. Therefore upon the return feed movement of the slide only the new film brought over the aperture may be exposed upon the operation of the shutter and I have provided a suitable stop to limit this return feed movement so that the film is fed the distance of two apertures only. The means shown for that purpose consists of a sliding stop 76 fitted to a suitable slide-way formed by slide-way plate 77. The stop 76 has an operating button 78 suitably extended to the exterior of the casing and this stop is positioned to be moved into the path of the operating bar 68 to limit its return movement to half its normal feed movement. As will readily be understood the presence of the shutter 74 will correspondingly reduce the size of the aperture 4 to take a half sized picture and protect the previously exposed film.

Means are provided for operating the take-up reel 1 so that it will take up the exposed film as the slide is feeding new film over the aperture 5. The means here shown is of a nature to compensate for varying diameter of the roll of film on the take up reel and to that end is frictionally driven. The take-up reel is journaled upon a two part spindle 80—80' and the hub 82 thereof is formed with a key or cross-slot to receive a key 84 whereby the reel is rotatively secured to a friction disk 85. The disk 85 is journaled on the spindle 80 in frictional engagement with a coacting similar disk 86. This latter disk 86 is also journaled on the spindle 80 and it is positively driven by the feed movement given the operating bar 58. The bar 58 is provided with an integral toothed rack 88 in mesh with a segmental gear 90 journaled on the shaft 80 and having pivotally mounted thereon a feed pawl 91 spring pressed into engagement with a drive ratchet 92 integrally formed with the positively driven disk 86. As will readily be understood a positive reciprocating motion will be imparted to the pawl 91 on the operation of feeding the film and by the engagement of the pawl with the ratchet movement will be communicated to the friction disks in the direction for taking up the film only. In the manner well known, further movement of the disk 86 than that required to take up the film will cause slipping of the friction between the disks. A spring 94 is arranged to press the disks into frictional contact. The part 80 of the spindle is rigidly mounted on one side of the casing and the opposite part 80' thereof is removable with a portion 95 of the casing which provides for an opening for the insertion of the reel. The supply reel 2 is similarly journaled on a two-part spindle 96—96' the latter part being carried by a cover portion of the casing 98.

An additional feature is provided for informing the operator of the amount of film that has been fed through or remains to be used and consists in an indicating device or counting mechanism operated by the movement of the film. In the form shown in Fig. 1 this device is arranged to be operated from the positively driven disk member 86. The disk member is provided with a counter-pinion 100 in mesh with a larger pinion 101 journaled upon a trunnion 102 on the casing. The pinion 101 meshes with a similar pinion 104 journaled on a spindle 105 (Fig. 3) and on the outer face of this pinion is a pin upon which is journaled a small pinion 107 to be revolved upon the rotation of the pinion 104. This pinion 104 is arranged in mesh with the teeth of both an annular stationary controlling rack 108 and a dial pinion 110. The rack and pinion 110 are arranged concentric with the pinion 104, the rack as shown having a sleeve fitted to the spindle 105 and the dial pinion 110 is journaled on the sleeve of the rack. The rack and dial pinion have an unequal number of teeth, the rack having one tooth more than the pinion. In consequence, upon each revolution of the pinion 104, carrying with it the pinion 107, the annular rack 108 will control the rotative movement of the pinion 107 which by its engagement with the dial pinion 110 will cause the latter pinion to be rotated proportionate to the difference in the number of teeth between rack and pinion 108—110. Thus for each full rotation of the pinion 104 the dial pinion 110 will be rotated the distance of one tooth. On the outer face of the dial pinion a suitably graduated and numbered dial 112 is affixed to be conveniently observed by the operator through a sight aperture 114 in the casing.

In Figs. 6, 7 and 8 I have shown a desirable modified embodiment of the features of my invention wherein the counting mechanism is actuated by a suitable sprocket moved by direct engagement with the film. The camera there shown employs the usual arrangement of shutter associated with the lens barrel 120. Provision is made for the adjustment of the lens for focusing by forming the camera frame of two parts 122 and 123 having a telescopic arrangement; the part 123 carrying the lens barrel and being fitted to slide in the part 122 which is secured on the aperture plate 4.

The shut-off door or screen 74,' here shown, is arranged to be swung into the field of the lens for dividing the field in two so as to take a half size picture by being supported on a pivot shaft 125 journaled in the casing and in the part 122. On its end, exterior of casing, it is provided with a finger lever 126 by means of which it is swung into operative or inoperative position as desired.

The upper guiding sprocket 7' on shaft 128, having journal bearings in the casing, is adapted to perform an additional function to that of guiding the film. By reason of the sprocket teeth 130 thereof registering with the apertures of the film $f$, the film as it passes over the sprocket positively turns the sprocket proportionate to the movement of the film and it is arranged so that the movement thereof will actuate the counting mechanism. The arrangement, as shown, consists of a pinion 132 on the sprocket shaft 128, meshing with a larger pinion 133 journaled on screw stud secured to the casing. Secured to rotate with the pinion 133 is a small reducing pinion 134 in mesh with a large pinion 135 having a reducing smaller pinion 136 connected thereto and journaled on bearing stud 138. A third larger pinion 140 meshes with the pinion 136 to be driven thereby. The larger pinions 133—135 and 140 have their outer faces suitably marked as decimal counters to be observed through suitable sight holes 133,' 135' and 140' in the casing. The sprocket 7' is provided with eight teeth around its periphery so that for each full size picture the sprocket will be given a half rotation and the pinion 132 is one fifth the size of pinion 133 which will tabulate the units; pinion 135 is geared ten to one with pinion 134 for tabulating the tens and pinion 140 indicates the hundreds. The counter dials are marked to measure the movement of the film proportionate to the number of full sized pictures or their equivalent in half sized pictures which have been taken. Thus the operator is enabled to observe the number of full size units of film exposed and of course the number of pictures which may be taken on the remainder of the film of a known capacity.

The back plate 14 of the camera is desirably removable for inserting the film and in accordance with my invention is arranged to provide a supplemental rear opening when desired without affecting the film holding parts thereby to permit of projecting the pictures upon a screen or for enlarging in the customary manner. The film of course will have been developed and the use of a suitable lantern and lens is contemplated in the operation of projecting and enlarging. To permit of the camera being so converted into a projecting machine in the aforementioned manner, a supplemental removable door 14' is provided in the back plate 14 in alinement with the aperture 5, and the pad holding springs 12' are spaced to be at either side of the pad 10' then employed which is suitably apertured as shown for the passage of the projecting rays.

I have thus produced a camera for taking a large number of single exposures and for conveniently feeding the film and spacing the pictures thereon so that the traveler is enabled by its use to record a great number of scenes in the most compact manner. The rolls of film are readily available and may be provided upon the reels as shown or enclosed in suitable light-tight magazines which are placed in the camera in the usual manner.

As many changes could be made in the above construction and many apparently widely different embodiments of this invention could be made without departing from the scope thereof, it is intended that all matter contained in the foregoing description or shown in the accompanying drawings shall be interpreted as illustrative and not in a limiting sense.

Having described my invention I claim—

1. A camera adapted for taking pictures on a perforated film having in combination a suitable inclosing casing, a lens, an aperture frame, a film supply reel, a film take-up reel, means for operating the take-up reel to take up the film, means for feeding the film over the aperture to be in position for making the exposures, means for limiting the movement of the film feeding means for properly spacing the pictures thereon, said means being adjustable to vary the feed movements of the film for taking smaller pictures when desired, a protective screen adapted to diminish the size of the aperture when reduced pictures are being taken and an independently operating shutter operative to expose the film for recording of the pictures thereon.

2. A camera adapted for taking pictures on a perforated film having in combination, a suitable inclosing casing, a lens, an aperture frame, a film supply reel, a film take-up reel, means for operating the take-up reel to take up the film, means for feeding the film over the aperture to be in position for making the exposures comprising a movable slide member and means thereon for engaging the film whereby the feed movement thereof is imparted to the film, a protective screen carried by the slide and operative with relation to the aperture to enlarge the aperture in proportion to the feeding of the film and an independently operating shutter operative to expose the film for recording of the pictures thereon.

3. A camera adapted for taking pictures on a perforated film having in combination a suitable inclosing casing, a lens, an aperture frame, a film supply reel, a film take up reel, means for operating the take-up reel to take up the film, means for feeding the film over the aperture to be in position for making the exposures, means associated therewith for determining the movement imparted to the film and means for adjusting the size of the aperture proportionate to the movement imparted to the film and an independently operating shutter operative to expose the film for recording of the pictures thereon.

In testimony whereof I have signed my name to this specification in the presence of two subscribing witnesses.

ALFRED H. MOSES, Jr.

Witnesses:
PHILIP LONERGAN,
GERTRUDE E. MUNRO.